United States Patent [19]
Lundberg et al.

[11] Patent Number: 5,100,229
[45] Date of Patent: Mar. 31, 1992

[54] SPATIAL POSITIONING SYSTEM

[75] Inventors: Eric Lundberg; Yvan Beliveau; Timothy Pratt, all of Blacksburg, Va.

[73] Assignee: Spatial Positioning Systems, Inc., Blacksburg, Va.

[21] Appl. No.: 570,268

[22] Filed: Aug. 17, 1990

[51] Int. Cl.[5] .................. G01C 1/03; G01C 3/00; G01C 5/00
[52] U.S. Cl. ........................ 356/1; 172/4.5; 356/4; 356/141; 356/152
[58] Field of Search ............ 356/1, 4, 141, 152; 172/4.5

[56] References Cited

U.S. PATENT DOCUMENTS

| | | | |
|---|---|---|---|
| 3,846,026 | 11/1974 | Waters | 356/152 |
| 4,218,834 | 8/1980 | Robertsson | 89/41.06 |
| 4,677,555 | 6/1987 | Goyet | 356/1 |
| 4,700,301 | 10/1987 | Dyke | 356/1 |
| 4,820,041 | 4/1989 | Davidson | 356/1 |
| 4,912,643 | 3/1990 | Beirxe | 356/1 |
| 4,943,158 | 7/1990 | Pertl et al. | 356/4 |
| 4,981,353 | 1/1991 | Murakawa et al. | 356/1 |

Primary Examiner—Stephen C. Buczinski
Attorney, Agent, or Firm—Wegner, Cantor, Mueller & Player

[57] ABSTRACT

A spatial positioning apparatus providing three-dimensional position information and methods to utilize the position information for improved surveying, construction layout, equipment operations, manufacturing control and autonomous vehicle control is disclosed. The spatial positioning apparatus includes at least three, preferably four, fixed referent stations. A minimum of two, preferably three, of the fixed stations sweeps a spread laser beam horizontally across the site of interest. The remaining fixed station sweeps a spread beam vertically across the site of interest. A strobe signal is emitted from each fixed station when the rotation mechanism actuates a rotation datum. The spatial positioning apparatus also includes one or more portable position sensors. The portable position sensor includes a light sensitive detector, a computer, and a display. The x, y, z coordinates of the portable position sensor are obtained through a triangulation technique based on time marks received from each spread laser beam from the fixed stations and the rotation datum received from the strobe of each fixed station. Multiple portable position sensors for use in attitude information for productivity improvement for equipment and for control of autonomous vehicles are disclosed.

27 Claims, 13 Drawing Sheets

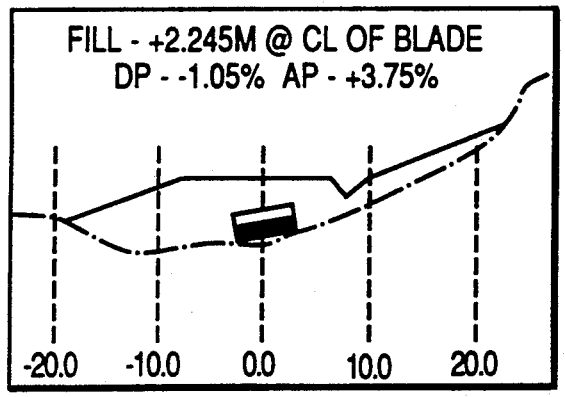
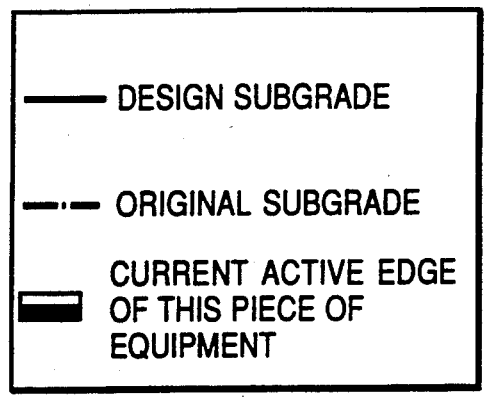
FIG. 10A
FIG. 10B
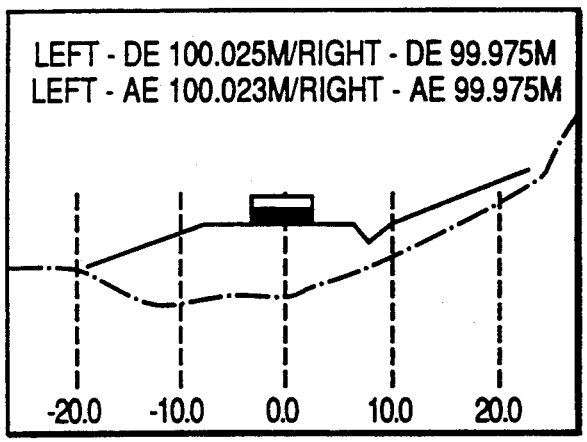
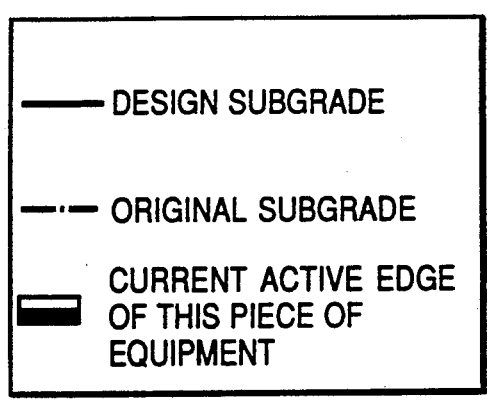
FIG. 11A
FIG. 11B
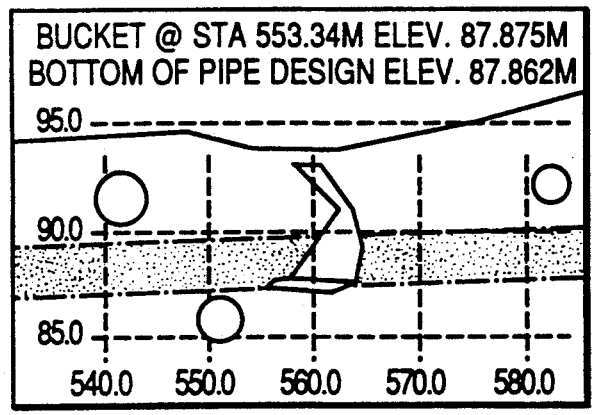
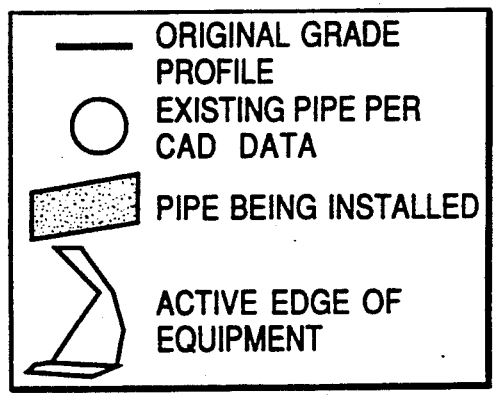
FIG. 12A
FIG. 12B

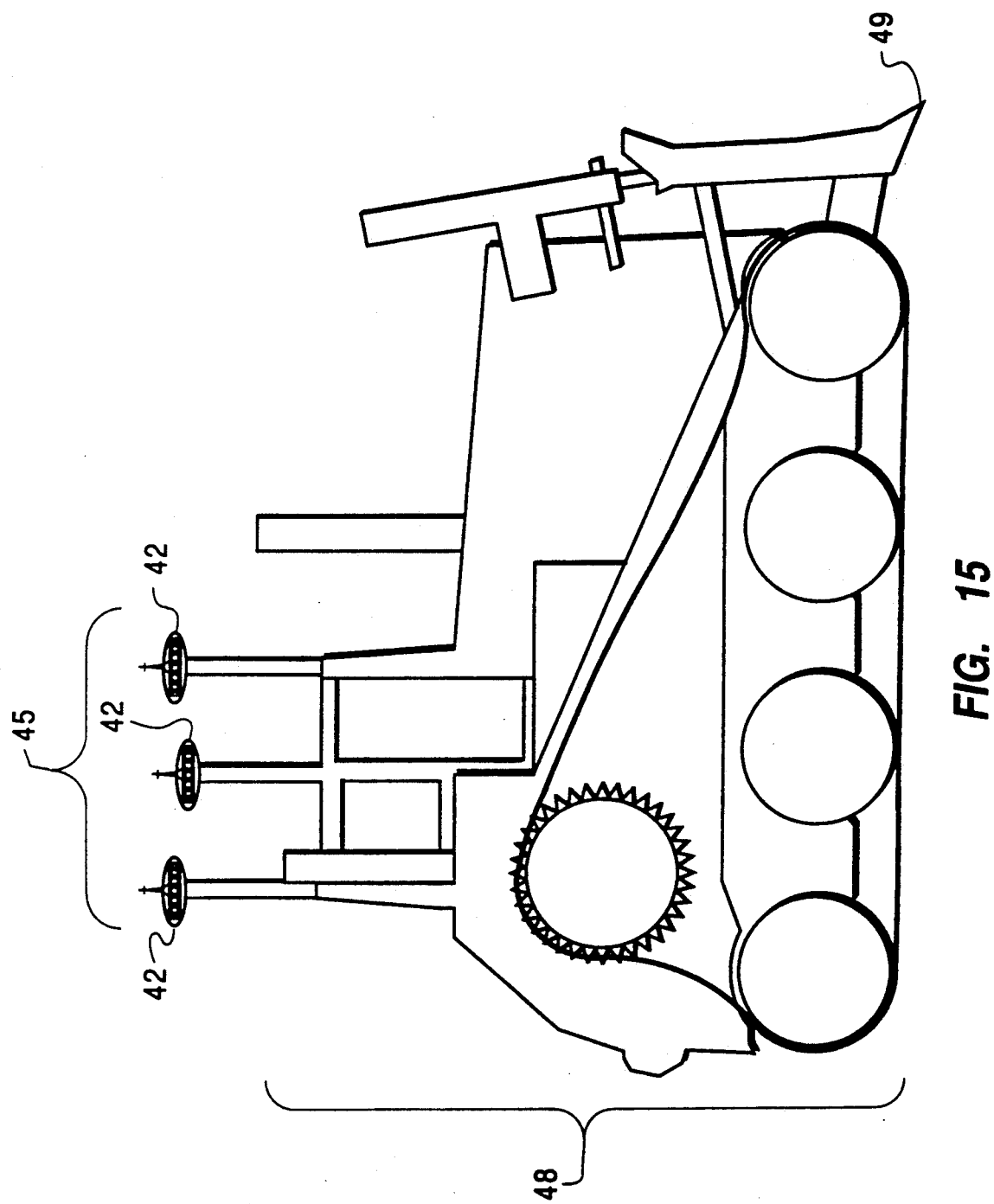

SPATIAL POSITIONING SYSTEM

FIELD OF THE INVENTION

The present invention relates to a spatial positioning system and, more particularly, to a spatial positioning system which provides the three-dimensional position of an object using three or more fixed referent stations systems and one or more portable position sensors, and can provide feedback for adjusting the position of the object.

BACKGROUND OF THE INVENTION

Triangulation is a well known method of determining position. The basic premise of triangulation is as follows: given that a triangle has three sides and three interior angles for a total of six items of measurement, when three of these items of measurement are known, the remaining three unknown items of measurement can be resolved.

Resection is also a well known method of determining position. Resection is a special application of the triangulation method of positioning. The basic premise of resection is as follows: given three points of known position and a point of unknown position; the coordinates of the unknown point can be calculated when the angles between lines linking the three points of known position to the point of unknown position are also known.

A thesis entitled "The Design and Development of a Mobile Robot Location System" by Theodore Scott Rappaport, published in Dec., 1984, discloses two methods for determining position. The first of Rappaport's methods (Method I) is based on the special application of triangulation called resection. The positioning system utilizes three light beacons located at known positions and a rotating detector head which rotates at a constant angular velocity. The rotating detector head is attached to a mobile robot located in a unknown position The angles between the lines of the three light beacons and the rotating detector head are determined through time measurements. A computer generates a time measurement each time a photodetector located on the horizontally rotating head detects a light beacon as the photodetector scans a horizontal plane. Time measurements are obtained as each beacon activates the photodetector.

Identifying the individual beacons, which is necessary in order to determine position, is accomplished by modulating one of the beacons differently than the other two beacons. A prototype mobile robot and positioning system was built of the above Method I system. Accuracies of ±100mm were obtained except in "zones of ambiguity", which were defined as the area where adjacent beacon angles were less than 30 degrees.

The second positioning method disclosed by Rappaport (Method II) is one in which rotating light beacons are fixed in known positions and a portable light-detector is attached to the mobile robot.

Both Method I and Method II as disclosed by Rappaport can work only as an x, y positioning system. Method I utilizes timing of a rotating mechanism on a mobile robot. This rotating mechanism requires a very stable platform which will accommodate the movement of the mobile robot and ensure a horizontal plane, thus limiting the practicality of the system for variable z-axis measurements. Method II suffers from limited z-axis control and did not expressly provide for the synchronization of the time between the fixed stations and the portable station.

U.S. Pat. No. 4,700,301 to Dyke discloses a method of automatically steering agricultural type vehicles on a predetermined course. In order to accomplish this, Dyke discloses a method of sensing the present position and direction of motion of the vehicle. The present position and direction are then compared to the predetermined course and the steering angle is adjusted to compensate for any differences.

More specifically, Dyke discloses installing a laser emitting a narrow beam of light and an optically aligned directional light detector on a rotating platform on the vehicle. Retroreflectors are placed at reference points around the field in which the vehicle is operating. When the laser light hits the retroreflectors, the reflected light is detected and the computer records counts corresponding to the times of the hits. The position of the vehicle can be determined from these counts.

Alternatively, Dyke discloses that the position of the vehicle can be determined using lasers rotating at a constant angular velocity located at two reference points, and an all directional light with a radio transmitter for transmitting a detect signal to the vehicle located at a third reference point. When the reflected light is detected, the computer records counts corresponding to the times of the hits. The position of the vehicle can be determined from these counts.

The method disclosed by Dyke provides only a method for determining position of a vehicle in an x-y plane. There is no provision for determining position in an axis perpendicular to the x-y plane, i.e., the z-axis Moreover, the method suffers from the disadvantage that it is limited to sites which are relatively planar.

U.S. Pat. No. 4,820,041 to Davidson et al. discloses a position sensing system for surveying and grading. The system includes two laser reference stations, each of which emits a laser beam that periodically sweeps across the area to be surveyed Each time a laser beam strikes the opposite reference station, a radio timing signal is broadcast by that reference station. Thus, each reference station must be connected by a line-of-sight to each other reference station so that all reference stations are on essentially the same elevation. The system also includes a portable sensing station having a laser beam receiver, a radio receiver and a programmed computer. The position of the sensing station in the x-y plane relative to the reference station is computed based on the relative timing of detection of the laser beams and the reception of the radio signals. The position of the sensing station in the z-direction, i.e., elevation, is determined according to the height at which one of the laser beams strikes the laser beam receiver.

The system disclosed by Davidson et al. suffers from several disadvantages. As Davidson et al. themselves acknowledge at column 24 of the patent, three such laser reference stations are required, as a practical matter, in order to improve the area of coverage and accuracy of the system. By using three such laser reference stations in an appropriate layout, the region of measurement ambiguity, which occurs in the area between two reference stations where the interior angles are very small and thus the intersection of the laser beams at the sensing station approaches a straight line, is eliminated. The incorporation of a third reference station is not described, and Davidson et al. does not disclose how this could be done in view of the need to have a line of sight between the reference stations in order to activate the timing datum. Furthermore, Davidson et al. does not disclose how the portable sensing station would identify the incoming laser beams from the individual reference stations, which is necessary in order to calculate position. This identification is a particular problem since a practical system will need a minimum of three laser reference stations, and this third laser beam will add significant identification complexity.

The four-sided linear array detector of the portable sensing station disclosed by Davidson et al. limits the range of vertical positioning to the length of the linear array, without some mechanical method of raising and lowering the four-sided linear array detector along the z-axis. In addition, the electronic circuitry required to manage the information from the four-sided linear array detector is complex. The vertical accuracy achievable in the Davidson et al. system with the four-sided linear array detector is a function of the height of the individual linear array detector elements, which is limited to a minimum height in order to provide sufficient photosensitive surface area to detect the laser beam. The horizontal (x, y) accuracy of the system disclosed by Davidson et al. is limited by the distance of the individual detectors of the four-sided linear array detector to the actual center of the portable sensing station, the position of which is being determined.

Moreover, the system disclosed by Davidson et al. requires alignment of each laser beam into a specific plane containing the laser and the reference photodetector corresponding to that laser. Thus, the measurement accuracy of the system disclosed by Davidson et al. depends, in a large part, on the distance of the portable sensing station from the fixed reference stations There is no disclosure of how the system could be adapted for use on a large non-planar site (i.e. typical construction site) where more than two laser reference stations would be needed to achieve a useful accuracy over the entire site.

Furthermore, the range in which all coordinates (x, y, z) of the portable sensing station disclosed by Davidson et al. can be determined is limited to the planes where both rotating laser beams will strike the four-sided linear array detector.

SUMMARY OF THE INVENTION

The present invention provides a spatial position system utilizing at least three fixed referent stations, although four are preferred, to determine the position of one or more portable position sensors. Each fixed station preferably includes a laser and a strobe transmitter. The laser produces a laser beam having a predetermined divergence or spread which is rotated at a constant angular velocity in a direction perpendicular to the spread. Each time the spread laser beam passes a specific point in its rotation, the strobe transmitter is triggered and a pulse is emitted. This point in the rotation is referred to as "the rotation datum". The "rotation datum" is thus defined as an arbitrarily chosen "actuation" or "trigger" line selected internally for the corresponding fixed station independently of the other fixed stations. The strobe transmitter can be of the type emitting a light pulse (light strobe transmitter) or the type emitting a radio pulse (radio strobe transmitter).

There are preferably two types of fixed stations, horizontal and vertical. In the horizontal fixed station, the laser beam is rotated in a horizontal plane. In the vertical fixed station, the laser beam is rotated in a vertical plane. Preferably, at least three horizontal fixed stations and one vertical fixed station are used to ensure consistent x-, y-, z- positioning across an entire site.

An alternate spatial positioning system would require only three fixed stations to obtain three-dimension position capability, and would not have potential regions of ambiguity as in the above system. The three fixed stations would be set at different axes. A unique position solution exists for all points covered by the rotating laser beams from the fixed stations. The axes selected would be such that the area to be measured was covered by each of the spread laser beams emitted from the fixed stations.

The portable position sensor preferably includes a light sensitive detector, a computer and a display. The light sensitive detector is preferably a disk of predetermined thickness oriented in a horizontal plane having a photosensitive area covering the circumference of the disk. When struck by either the laser beam or the strobe pulse, the detector generates an electric pulse which is sent to the computer. If a radio strobe pulse transmitter is used instead of a light strobe pulse transmitter, the portable position sensor also includes a radio receiver which generates an electric pulse which is sent to the computer upon receipt of a radio strobe pulse. Once the computer has accepted, time-labeled and recorded two strobe pulses and an intermediate laser pulse from each fixed station, it can determine the three-dimensional position of the detector and present this information to the operator on the display for determination of a position on the site.

The horizontal position of the portable position sensor is determined through a trigonometric algorithm, which uses horizontal angles determined from time information of the rotating lasers beams and the strobe signals of the horizontal fixed stations. The vertical position of the portable position sensor is generated using a trigonometric algorithm, which uses the horizontal distance to a vertical fixed station system, as calculated above, and an angle which is calculated from time information from the rotating laser beam and the strobe signal broadcast by the vertical fixed station system. The information can be displayed to an operator of mechanized equipment providing position information for control of the machine, or it can be sent to a autonomous control system for automatic control of a machine.

Additionally, the invention advantageously may be used for surveying underwater, as long as the water is not too turbid. nI this way, complex geometries (e.g. parabolas, hyperbolas) can be accurately produced using the spatial positioning system in such operations as earthmoving and fabrication; whereas previous technology would only allow simplified geometric approximations.

Since the rotation datum of each fixed station is self-contained, i.e., each rotation datum is determined internally of the particular station, and the signal corresponding to the rotation datum is generated at the same fixed detector, multiple fixed detectors can be quickly setup, without the need to align the laser beams of opposite reference stations. Moreover, the fixed stations need not be located at the same elevation.

The present invention provides a unique solution for x, y, z, position measurement through the use of spread laser beams from the horizontal fixed stations to accurately determine x,y position over a signification variation in z (elevation). A linear array of detectors is not required in the present invention. A simple, flat circular detector is preferred with no minimum vertical height requirement. This provides for an uncomplicated laser detector at the portable position sensor.

The present invention provides a unique solution for the z-coordinate determination. The solution uses a vertical fixed station. The vertical fixed station rotates a spread laser beam in a vertical plane. The spread beam strikes the portable position sensor, and through a self-contained rotation datum, the difference in time of the spread beam strike and the rotation datum provides a horizontal interior angle. Since the x-y position is known from measurements made with the horizontal fixed stations, the z-coordinate determination can be done with the same relative accuracy as the x-y coordinate determination.

The circular detector will produce an output pulse when crossed by a laser beam, which has a peak which consistently corresponds to the laser beam crossing the center of the portable position sensor. Although a detector disk of some thickness with a suitable photosensitive material on its circumference would be preferable, a polygonal detector, having a plurality of sides or facets may be used as a suitable alternative to the circular detector.

This invention identifies the origin of the laser beams which strike the portable position sensor by having each fixed station rotate at a unique rotation rate. Thus, the computer establishes a "window of time" when a laser beam or a strobe pulse from a particular fixed station is expected to arrive. The computer will continually update the windows of time to accommodate for movement of the portable position sensor and drift in the rotation rates of the motors. Alternatively, the laser beams may be identified through modulation of the wavelength of the lasers at different rates, or by using lasers of differing wavelengths.

A significant and unique application of the present invention is the use of position information integrated into a three-dimensional design environment. Electronic data in the form of graphical displays of a design environment can be integrated with the actual position information, provided by the disclosed positioning system. This allows for graphical, textual, and numerical position information to be simultaneously output to a user in a format designed for the particular user.

Another significant and unique application of the present invention is for guiding autonomous vehicles Through the use of multiple portable position sensors on a single machine, attitude (pitch, roll, and yaw) and Cartesian coordinate position information can be obtained. By integrating the information into an electronic database of a design, an autonomous vehicle can accomplish a task in a specific location without the need for a primary vision system. Of course, a secondary vision system could also be used to look for unexpected objects which have been misplaced. Such a secondary vision system could be provided by using any suitable mechanism, such as acoustical navigation systems or low-resolution camera systems.

The use of multiple portable detectors on a single machine to determine attitude and position can also be used to provide better information to equipment operators. Specially designed graphical, textual and numerical information can be presented to the operators to allow for improved equipment productivity and also to limit the amount of layout surveying required for complex operations.

BRIEF DESCRIPTION OF THE DRAWINGS

The above aspects of the present invention can be seen form the attached drawings, in which:

FIGS. 10A and 10B illustrate exemplary display screens for equipment operators in accordance with the present invention;

FIGS. 11A and 11B illustrate exemplary display screens for equipment operators in accordance with the present invention;

FIGS. 12A and 12B illustrate exemplary display screens for equipment operators in accordance with the present invention;

FIG. 15 illustrates a piece of mechanized earthmoving equipment with pitch, roll and yaw control in accordance with the present invention.

Figure 1A:
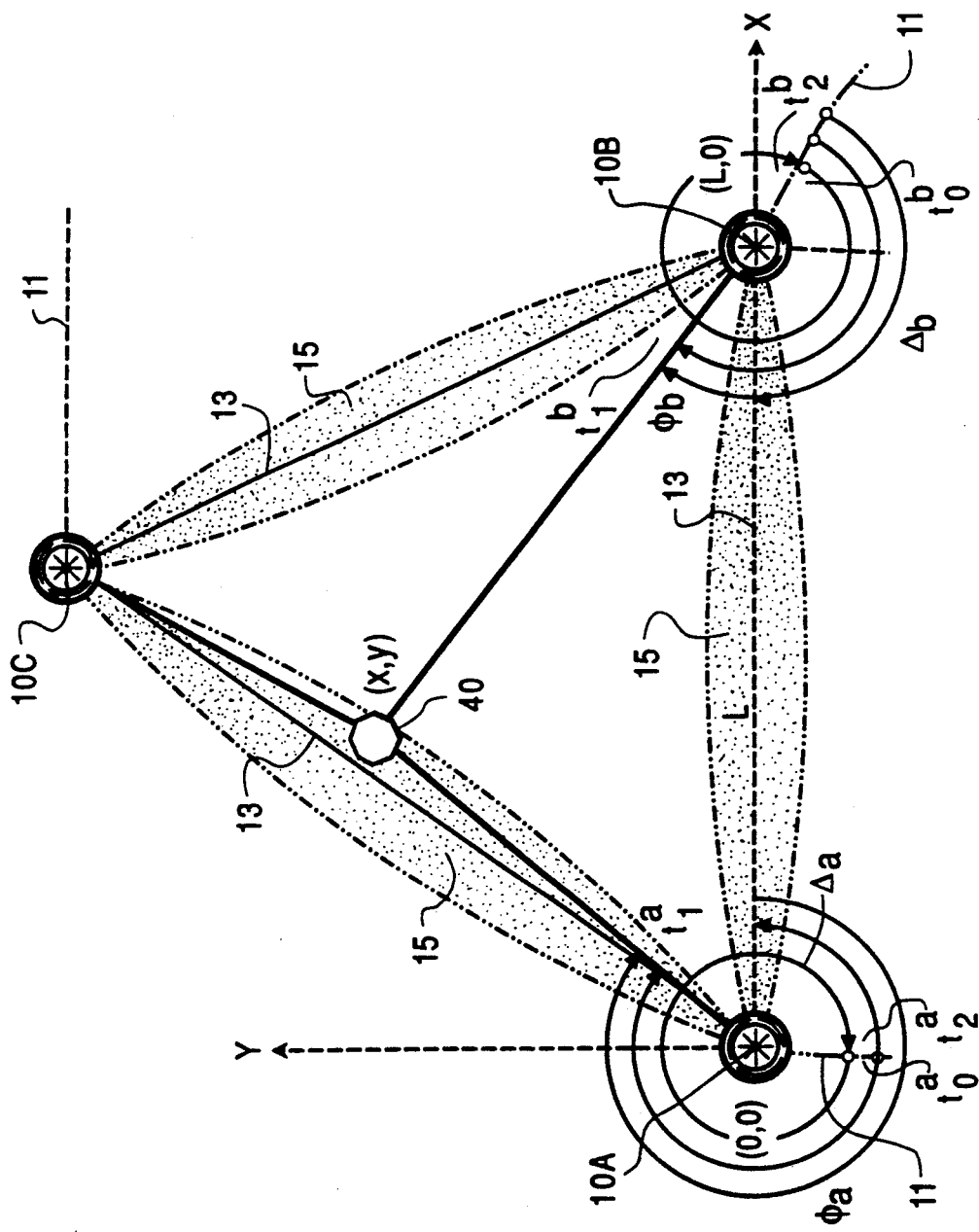
FIG. 1A is a schematic view illustrating horizontal sensing and positioning in accordance with a preferred embodiment of the present invention.

DETAILED DESCRIPTION OF THE PREFERRED EMBODIMENTS:

A spatial positioning system for horizontal positioning in accordance with a first preferred embodiment of the present invention is schematically shown in FIG. 1A. The system includes preferably three horizontal fixed referent stations (hereinafter "fixed stations") 10A, 10B and 10C, although only two such stations must be used, and portable position sensor 40. For ease of explanation, horizontal fixed station 10A is located at point (0,0) on a Cartesian coordinate system. Horizontal fixed station 10B is spaced a distance "L" along the x axis from horizontal fixed station 10A, so that horizontal fixed station 10B is located at point (L, 0). Horizontal fixed station 10C is located at another known position. The rotation datum 11 of the individual horizontal fixed stations is randomly positioned for each corresponding section. Portable position sensor 40 is randomly spaced a distance "x" along the x axis and a distance "y" along the y axis from horizontal fixed station 10A, so that portable position sensor 40 is located at point (x,y). The locations of the fixed stations are not limited to specific locations, and need only be somewhere within the three-dimensional Cartesian coordinate system.

Areas of ambiguity 15 exist where the interior angles formed by line 13 between a pair of fixed stations 10 and the lines connecting the portable position sensor 40 are small, for example, on the order of 5°. In this area of ambiguity 15, position measurements become increasingly inaccurate as the portable position approaches the line 13. The area of ambiguity 15 does not affect position measurement if three horizontal fixed stations 10 are used in calculating the position of the portable position sensor 40. This is because each pair of fixed stations, when detected by portable position sensor 40, generates x-y position information. Thus, when using three fixed stations, three x-y positions can be obtained (from the three permutations of pairs). These three x-y positions can be averaged to determine the actual x-y position. Alternatively, an algorithm may be used to determined which pair of fixed stations provides the most accurate position information based, for example, on the interior angles.

Figure 2:
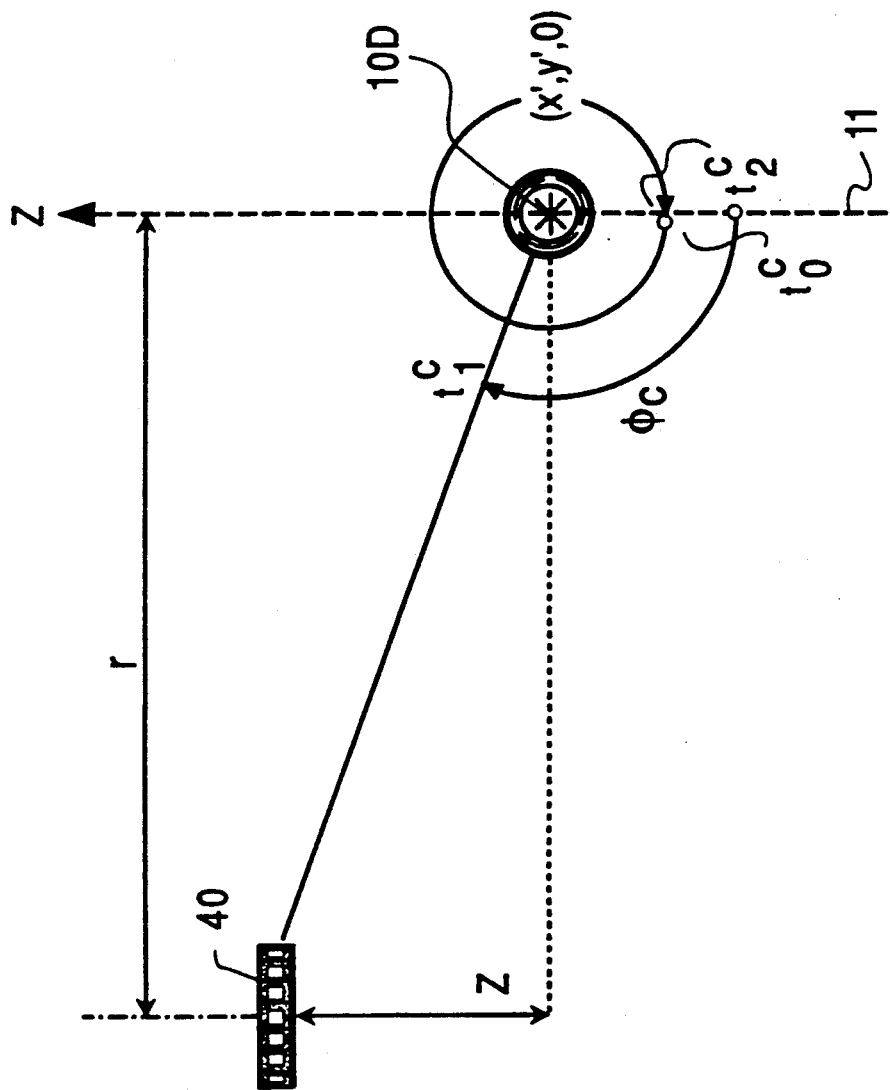
FIG. 2 is a schematic view illustrating vertical sensing and positioning in accordance with the preferred embodiment of the present invention shown in FIG. 1A.

Likewise, a spatial positioning system for vertical positioning in accordance with the present invention is schematically shown in FIG. 2. Vertical fixed station 10D is located at a point (x', y', O). The portable position sensor 40 is located at a horizontal distance "r" and a random vertical distance "z" from vertical fixed station 10D.

Figure 1B:
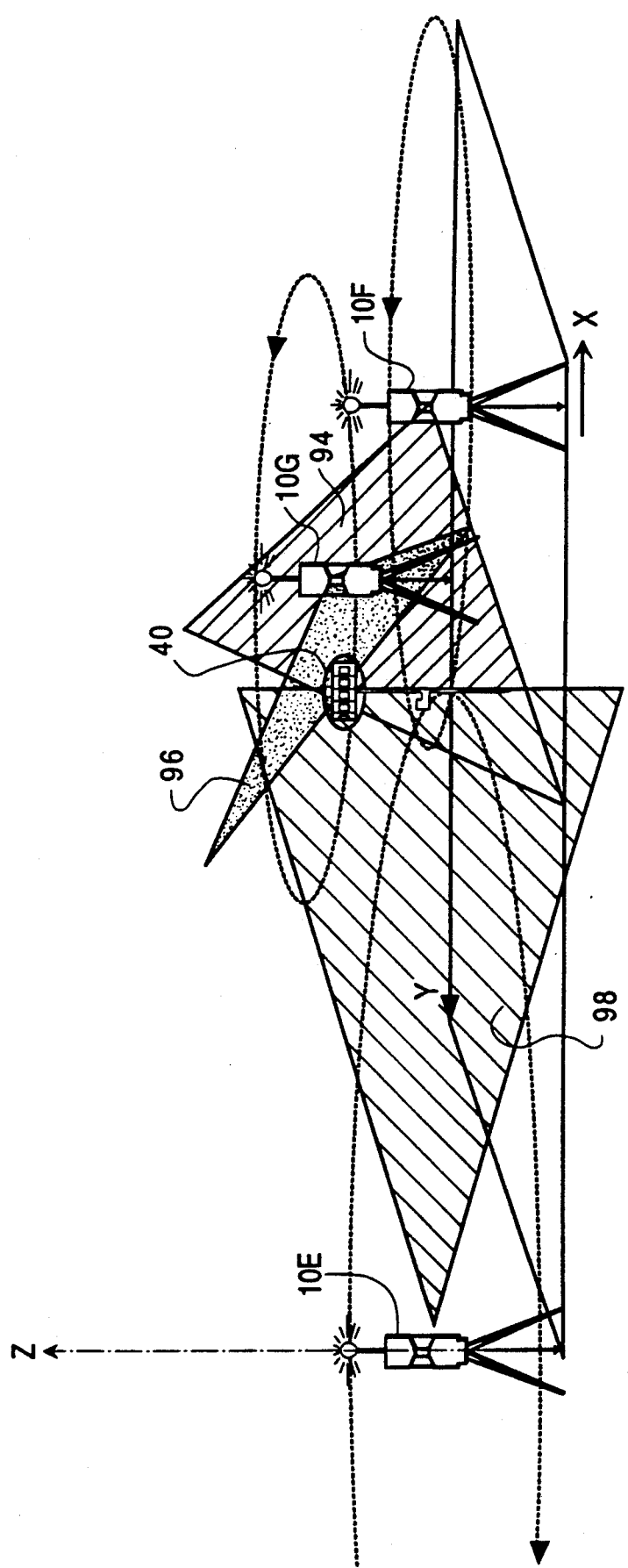
FIG. 1B is a schematic view illustrating three-dimensional position sensing and positioning in accordance with another preferred embodiment of the invention.

An alternate version of the spatial position system is shown in FIG. 1B. In this alternate version three fixed stations 10E, 10F and 10G are rotated horizontally. However, each of the three spread beams, 94, 96 and 98 are tilted on different planes. The system would also work where the axes of rotation of the fixed stations were tilted so that the axis of rotation of each fixed station is distinct from the axes of rotation of the other fixed stations, and the rotation of the laser beams 94, 96 and 98 were on different planes. The spread (divergent) tilted beams 94, 96 and 98 sweep throughout the area of the site. In some applications the spread beams 94, 96 and 98 will be shuttered or turned-off in areas not within the site. Fixed station 10G is shown as generating a rotating spread beam 96. The spread beams 94 and 96 are shown on tilted planes which are rotated about a vertical axis. Optimum accuracy would be achieved if the axes are each rotated 60° from each other. This alternate version of the spatial positioning system will provide three dimension position information at the portable sensor 40 from the spread beams of the fixed stations 10E, 10F and 10G.

Figure 4:
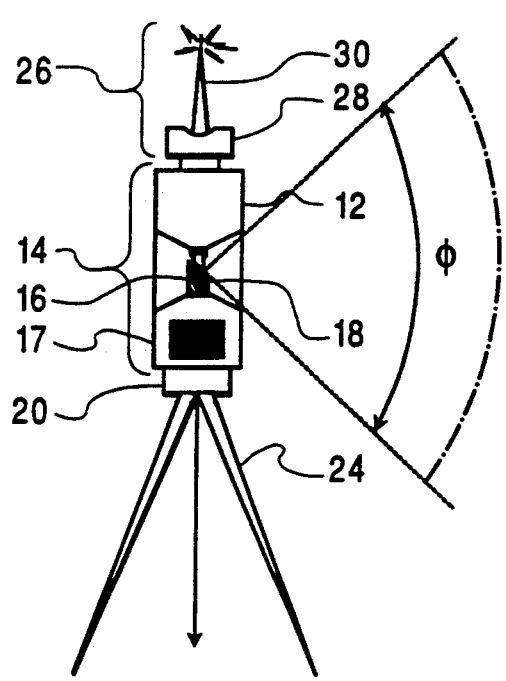
FIG. 4 is a side elevational view of a one preferred embodiment of horizontal fixed station in accordance with any of the preferred embodiments of the present invention.

As is shown in FIG. 4, each horizontal fixed station 10A, 10B and 10C preferably includes a laser 12 contained within a housing 14. The beam generated by laser 12 is directed to and reflected off of prism 16 having a conical reflector surface 18, thus producing a reflected laser beam having a predetermined angle of spread, i.e., amount of divergence, $\Phi$ in the vertical direction. Of course, the invention is not limited to the use of prism 16 and conical reflector surface 18, and any other suitable means may be used to produce the angle of spread $\Phi$.

The prism 16 with its reflective surface is rotated by a motor 17 contained within housing 14. It is most important that the motor, and hence the prism, rotate at a highly stable rotation rate (angular velocity). The stability of the rotation rate is critical to the measurement accuracy which the positioning system can achieve.

The prism, laser, and motor are aligned so that the laser beam produced by the laser 12 is reflected perpendicularly, which creates a reflected beam which is rotated in a plane orthogonal to the source laser beam. Thus, the spread of the reflected laser beam is perpendicular to the plane of rotation of the prism.

The housing 14 is preferably fixed to a leveling base 20. A conventional leveling mechanism, such as leveling bubbles (not shown), is used in such a way that will indicate when the plane of rotation is properly aligned with the horizon. A self-leveling mechanism (not shown) can also be used to maintain fine level requirements of the plane of rotation of the rotating laser beam. The leveling base 20 also preferably includes adjustable legs 24 to facilitate alignment of the plane of rotation. In the preferred embodiment illustrated in FIG. 4, this can be achieved by a conventional tripod having adjustable legs.

Figure 5:
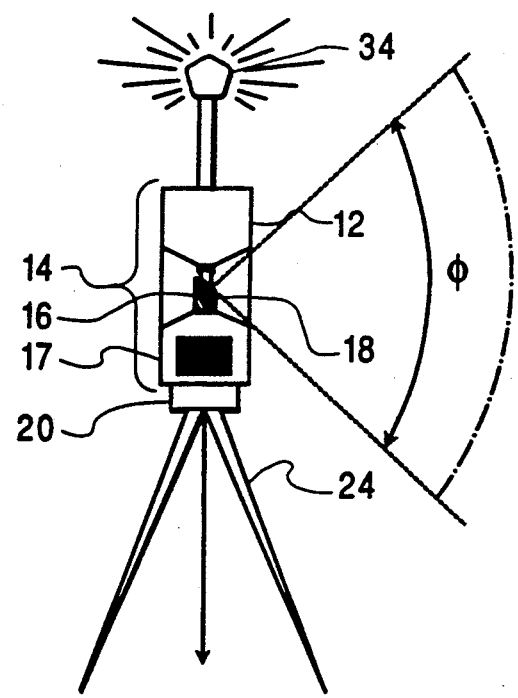
FIG. 5 is a side elevational view of another preferred embodiment of a horizontal fixed station.
Figure 6:
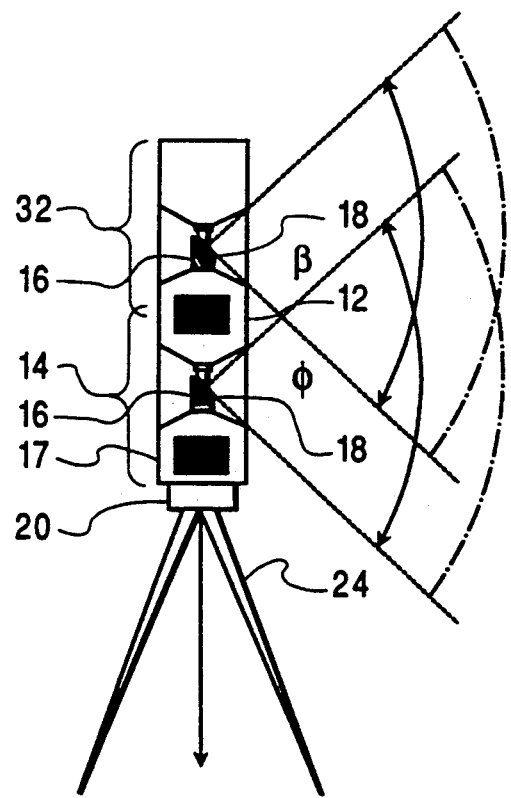
FIG. 6 is a side elevational view of another preferred embodiment of a horizontal fixed station.

Each horizontal fixed station 10A, 10B, 10C also preferably includes a communication mechanism 26. The communication mechanism 26 is activated and transmits a pulse of energy when the reflected laser beam crosses the rotation datum 11, in a manner to be described in detail below, so as to provide the time information necessary to calculate the position of the portable position sensor. In the preferred embodiment illustrated in FIG. 4 this communication mechanism is formed by radio strobe transmitter 28 and radio antenna 30. Alternatively, the communication mechanism is formed by a light strobe transmitter 34, as in the further preferred embodiment illustrated in FIG. 5, or of any other mechanism which can emit the desired communication information such as, for example, coaxial cable or optical fiber cable capable of delivering an energy pulse. The communication mechanism can either be a rotating, unidirectional mechanism, or a fixed omnidirectional mechanism. As is illustrated in FIG. 5, the light strobe transmitter 32 emits an omnidirectional light beam, which can be received by the portable position sensor 40. FIG. 6 illustrates an alternative light strobe transmitter 32 in which a directional light beam is emitted. This alternative light strobe transmitter 32 includes a prism 16 with a conical reflector 18, so that the reflected strobe light beam has an angle of spread $\beta$ in the vertical direction. This beam also can be divergent in the horizontal direction. The prism 16 of the alternative light strobe transmitter 32 rotates at a slower or faster speed than the prism 16 of the laser housing 14, so that over a period of time the strobe will emit a strobe transmission in all desired directions.

Figure 7:
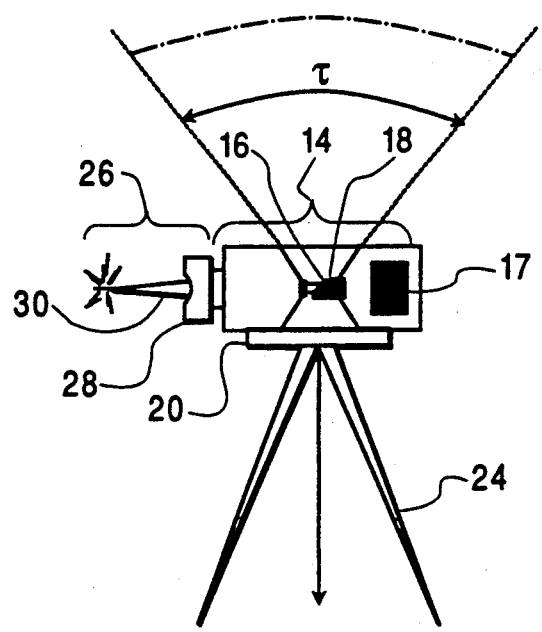
FIG. 7 is a side elevational view of a vertical fixed station in accordance with any of the preferred embodiments of the present invention.

The vertical fixed station 10D is illustrated in FIG. 7. The vertical fixed station is similar in all respects to the horizontal fixed station shown in FIG. 4 except that the axis of beam spread, and hence prism 16, is oriented horizontally instead of vertically, so that the laser beam is rotated in a vertical plane. In this way, the reflected laser beam has an angle of spread T in the horizontal direction. Although a vertical fixed station having a radio strobe transmitter communication mechanism is shown in FIG. 7, it is under stood that a light strobe transmitter or other type of communications mechanism can be used. The rotation datum 11 of the vertical fixed station is preferably aligned with the z-axis through a leveling mechanism used to level the laserprism-motor housing 14, however a time offset, to be describe below, may be used.

Figure 8:
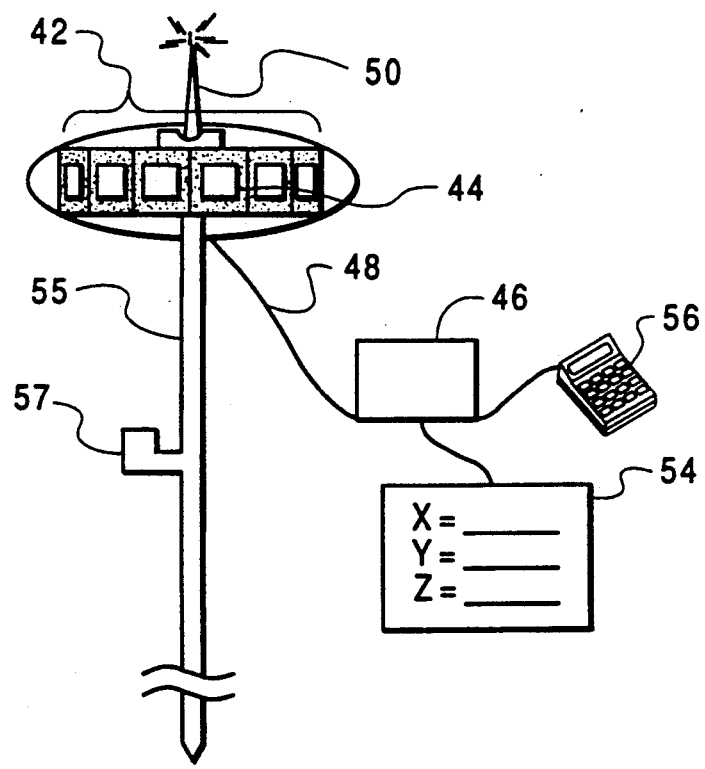
FIG. 8 is a side elevational view of a portable position sensor in accordance with any of the preferred embodiments of the present invention.

Portable position sensor 40, as shown in FIG. 8, preferably includes a polygonal detector 42 to detect the presence of both the laser beams and light strobe pulses. Alternatively, this sensor ideally could be formed of a flat disk with a suitable photosensitive material disposed about its circumference.

The polygonal detector 42 is formed of a plurality of individual photodetectors 44, such as silicon based photodetectors or any other suitable photodetectors, disposed around the circumference of the sensor on the outside facets of a polygonal-shaped support. An optical filter (not shown) fixed to the front face of each photodetector 44 may be used in situations were the ambient light level is high, such as outdoors in the sun. However, an optical filter is not needed if competing light sources are of low levels, such as outdoor at night or in many closed indoor environments. Each photodetector 44 generates an electric pulse when a laser beam strikes its surface. This electric pulse is sent to a computer 46, via a communication link 48, as part of the information necessary to determine the spatial position of the portable position sensor 40.

Portable position sensor 40 also preferably includes radio receiving antenna 50 for receiving radio signals generated by the fixed stations 10A, 10B, 10C, and 10D. As mentioned briefly above, the radio signals generated by the fixed stations convey information about the time at which the laser beams cross their respective rotation datum. Radio receiver 52 operatively coupled to antenna 50 generates an electric pulse when it receives a radio signal. This electric pulse is also sent to the computer 46 as part of the information necessary to determine the position of the portable position sensor. Alternatively, light strobe pulses transmitted by either light strobe transmitters 34 or 32 could be received by the polygonal detector 42. In this case, the photodetectors 44 of the polygonal detector 42 generate electrical pulses upon detection of a light strobe pulse. These electric pulses are sent to the computer 46, via communication link 48, as part of the information necessary to determine the position of the portable position sensor 40. To aid in their identification, the light strobe pulses may be coded by amplitude of wavelength modulation of the pulse, or by multiple pulses, or by pulses of differing durations.

The computer 46, which can be of any suitable type, assigns a time label to each electrical pulse received from the polygon detector 42 and, if used, the electrical pulses from radio receiver 50. The system is calibrated with an offset to compensate for any time lags due to, for example, the speed with which light travels from the prism 16 of each fixed station to the portable position sensor 40, or delays incurred by the time required for actuation of various parts. The computer generates the coordinates of the portable position sensor 40 through a series of mathematical algorithms. The portable position sensor 40 can be attached to a range pole 55 which is equipped with a bubble level 57. Thus, the computer 46 would determine the position of the bottom of the vertically aligned range pole 55 by subtracting the length of the range pole 55 from the computed z-coordinate of the portable position sensor 40.

The computed position coordinates are preferably output to an electronic display 54 coupled to computer 46. Display 54 is preferably an LCD or touch-screen, although any suitable display may be used. Input mechanism 56 is also preferably coupled to computer 46 to allow input of the positions of the fixed stations and to request various options in the software, such as system calibration. The input mechanism 56 is preferably a keyboard, although any other suitable input device may be used. A touch-screen monitor could be used for both input mechanism 56 and display 54.

The spatial positioning system includes a calibration sequence which must be followed before useful position information can be generated by the computer 46. The calibration sequence determines the x,y coordinates of the horizontal fixed stations 10A, 10B, 10C, and the x, y, z coordinates of the vertical fixed station 10D, and the offset calibration times of the rotation datums. The calibration sequence generates all necessary calibration information by successively placing the portable position sensor 40 in three points of known position. The offset calibration time is a time added or subtracted by the computer to the time labels corresponding to the rotation datum 12 of a horizontal fixed station (e.g., 10A). This time adjusts the time label to when the rotating laser beam is aligned with the straight line 13 connecting an alternate fixed station (e.g., 10B or 10C) from which position calculation will be generated. The time labels corresponding to the pair of fixed stations (e.g., 10A and 10B, or, 10A and 10C) are to be used to generate the coordinate information of the portable position sensor 40.

As discussed above, each time a laser beam emitted by a fixed station passes a specific point in its rotation, the strobe or radio transmitter is triggered and a pulse is emitted. This point in the rotation is referred to as "the rotation datum". Each rotation datum is generated internally of its corresponding fixed station. The position (x, y, z) of the portable position sensor 40 is determined from the angle turned by each laser beam from its rotation datum to the portable position sensor. These angles are calculated through time measurements of the laser beam pulses and strobe pulses detected at the portable position sensor.

In operation, horizontal positioning relies on the horizontal fixed stations 10A, 10B, 10C. These fixed stations are located in known positions. The rotation datum which triggers emission of the strobe pulse can be randomly located. The computer 46 runs through a calibration sequence, which involves placing the portable position sensor in a known three horizontal position, and calculates a time offset for the time of arrival of the strobe signal. This time offset is equivalent to the difference in time between the rotation datum being located on the line connecting the fixed station with any of the others. Vertical positioning relies on both horizontal position of the portable position sensor 40 and the time information relayed by the vertical fixed station 10D, as can be seen from FIG. 2.

Figure 3A:
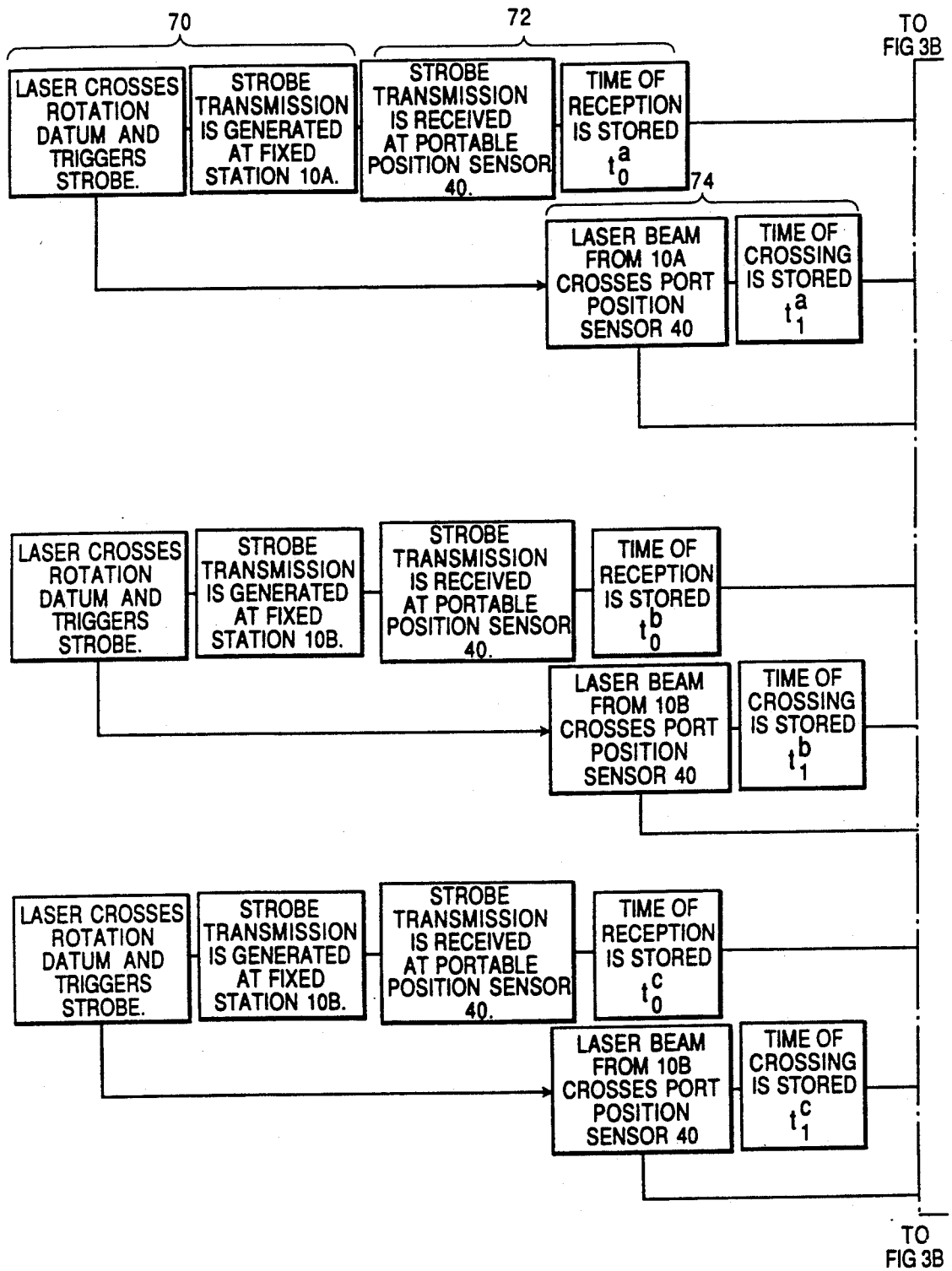
FIG. 3A-3C is a flow chart illustrating horizontal and vertical sensing and positioning as illustrated in FIGS. 1 and 2.
Figure 3B:
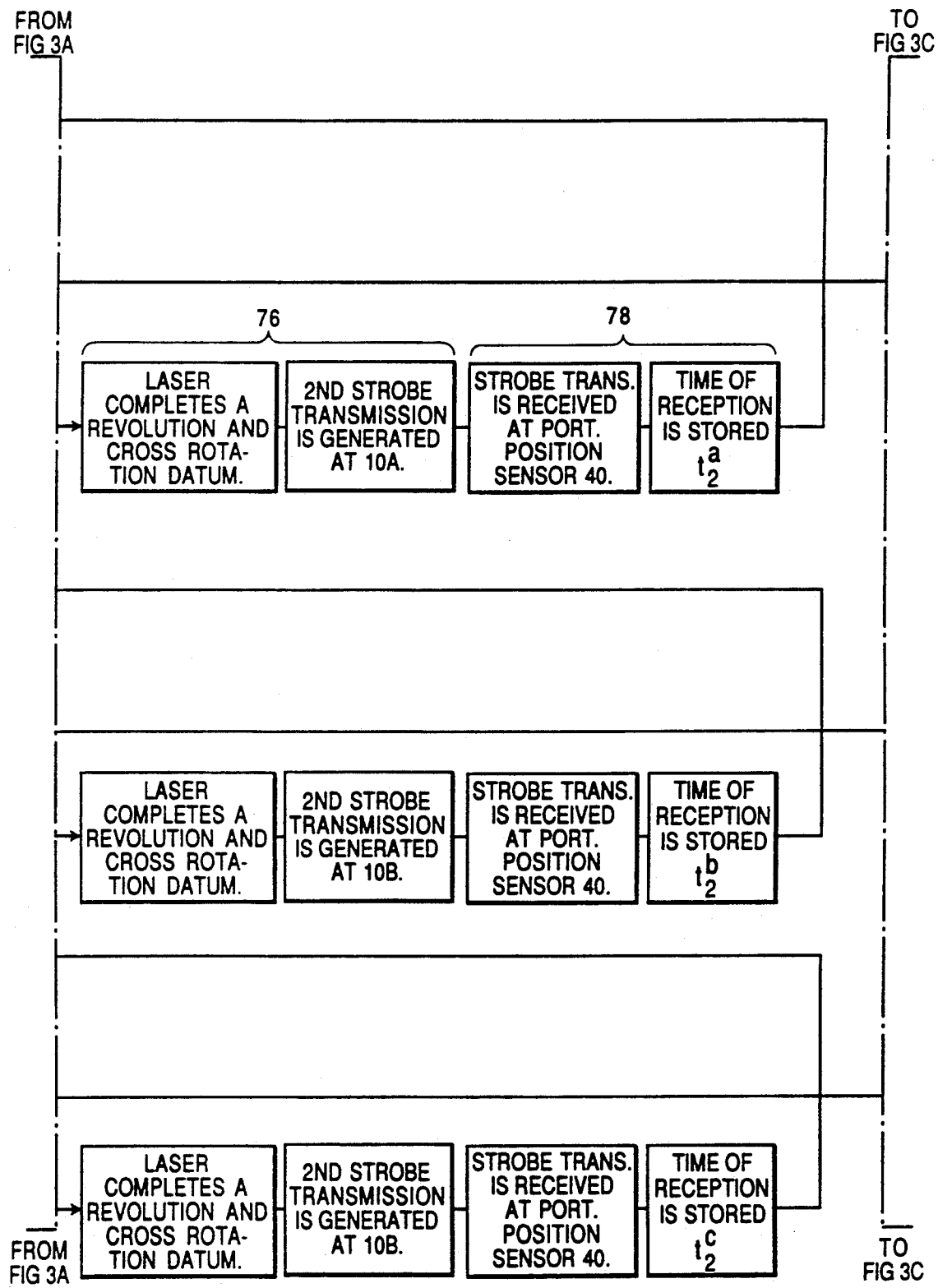
Figure 3C:
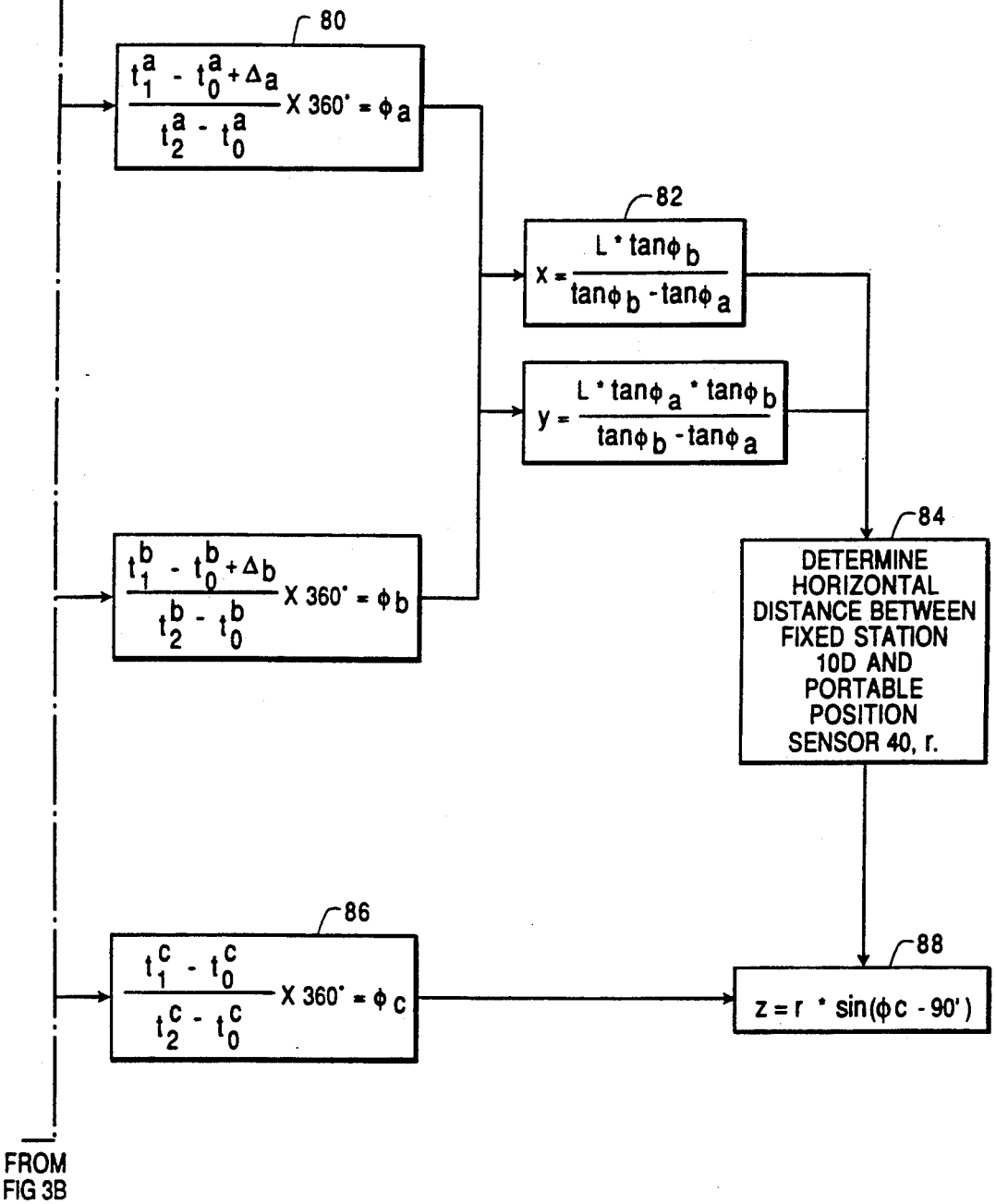

Horizontal fixed station 10A will be used as an example to explain the series of events set forth in the flow chart of FIG. 3. This series of events begins when the laser beam emitted by fixed station 10A crosses the rotation datum and a strobe pulse is emitted (at point 70). The strobe pulse is received at the portable position sensor 40 and the time of reception, i.e., the time label of this pulse, is stored in computer 46 (at point 72). As the laser beam emitted by fixed station 10A sweeps the area, it eventually will strike the portable position sensor 40, and the time of this strike, i.e., its time label, will be stored in computer 46 (at point 74). As the laser completes a revolution, it again crosses the rotation datum and triggers a second strobe pulse (at point 76). The second strobe pulse is received by the portable position sensor and the time of reception is similarly recorded by the computer 46 (at point 78). It is important to note that this series of events simultaneously occurs for each of the other fixed stations and the portable position sensor.

Once the computer records all of the necessary time labels, each horizontal angle is calculated as the ratio of the time of the laser beam striking the portable position sensor minus the time of the first strobe pulse, plus the calibration offset for the fixed station, to the time of the second strobe pulse, multiplied by 360 degrees. This can be expressed by the following equations (at point 80):

$$\frac{t_1^a - t_0^a + \Delta_a}{t_2^a - t_0^a} \times 360° = \phi_a, \frac{t_1^b - t_0^b + \Delta_b}{t_2^b - t_0^b} \times 360° = \phi_b$$

The horizontal coordinates (x,y) are then calculated through the following trigonometric algorithms (at point 82):

$$x = \frac{L \cdot \tan\phi_b}{\tan\phi_b - \tan\phi_a}, y = \frac{L \cdot \tan\phi_a \cdot \tan\phi_b}{\tan\phi_b - \tan\phi_a}$$

Once the horizontal position has been calculated, the horizontal distance between the portable position sensor and the vertical fixed station 10D is determined (at point 84). The vertical angle is calculated using the same ratio as used in conjunction with the horizontal angles described above. This equation is (at point 86):

$$\frac{t_1^c - t_0^c}{t_2^c - t_0^c} \times 360° = \phi_c$$

The vertical coordinate z is then determined by the following trigonometric algorithm (at point 88):

$$zl = r \cdot \sin(\phi_c - 90°)$$

Similarly, equations can be derived for solving the position of the portable position sensor 40 for the alternative spatial positioning system depicted in FIG. 1B. Assuming the fixed stations 10E, 10F and 10G are located in the positions (0, 0, 0), $(x_f, x_f, x_f)$ and $(x_g, x_g, x_g)$ respectively; and the tilt angles (as measured form the vertical axis) of the laser beams $\gamma_e, \gamma_f, \gamma_g$ are 0, 60°, and 60°, respectively; then the position of the portable position sensor 40 can be solved by the equations:

$$x = \frac{x_f \sin\theta_f - x_g \sin\theta_g - y_f \cos\theta_f + y_g \cos\theta_g - z_f\sqrt{3} + z_g\sqrt{3}}{(\sin\theta_f - \sin\theta_g) - \tan\theta_e(\cos\theta_f - \cos\theta_g)}$$

$$y = x(\tan\theta_e)$$

$$z = \frac{\sqrt{3}}{3}[(x - x_f)\sin\theta_f - (y - y_f)\cos\theta_f] + z_f$$

The spatial positioning system described above can be utilized in a multitude of applications. In addition, the interface with the user, the display 54, can be used to provide design information from a graphical database, such as computer-aided-design (CAD), through an interface with the computer. In this way a user of the spatial positioning system can graphically view his position within a two-dimensional or three-dimensional graphical model.

Computer simulations have shown that the spatial positioning system disclosed herein can achieve position measurement accuracies of ±5mm over a 400 m site, with a position measurement update rate of several times a second. This high degree of accuracy and the ability to provide the position information in real-time allows the disclosed positioning system to be applied to a number of applications where accurate, real-time positioning was not before possible. In addition, the disclosed system can be interfaced with graphical databases and provide real-time positioning in modeled graphical environments.

Figure 9A:
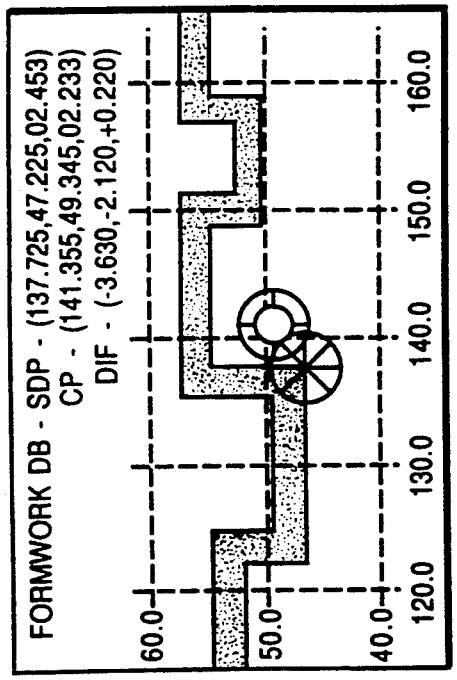
FIGS. 9A-9D illustrate graphical views of a display when the system of the present invention is used for construction lay-out.
Figure 9B:
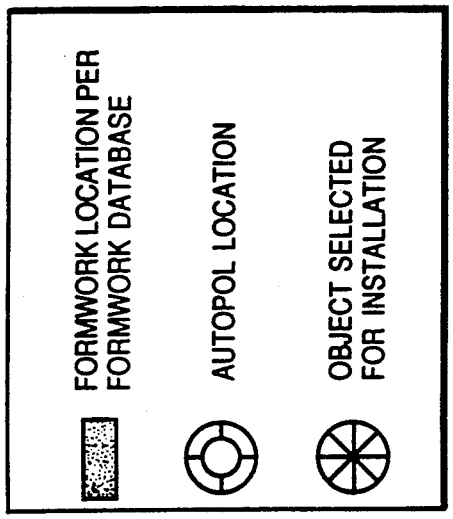
Figure 9C:
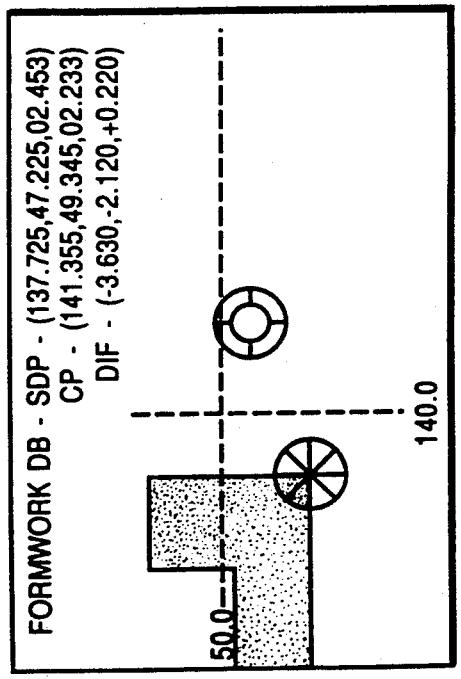
Figure 9D:
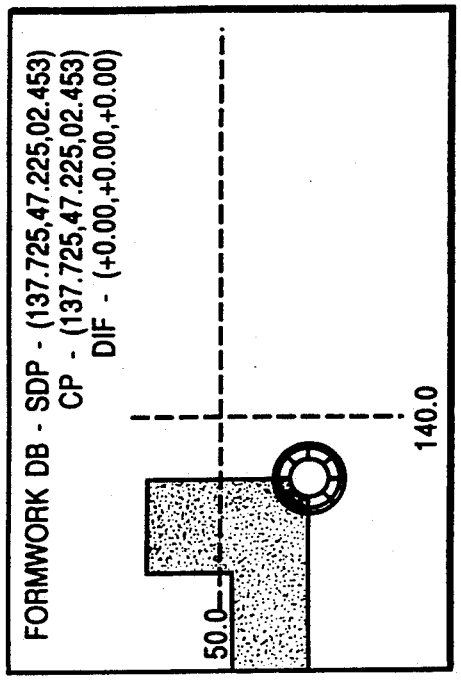

One exemplary application of the present invention involves linking the disclosed positioning system to an electronic model representation for construction layout. An electronic database of the design environment can be created by simple graphical techniques or can be generated from a previously generated 2D or 3D CAD design model of the construction site and objects under consideration. FIGS. 9A-9D represent various screens of a display 54 which is being used for construction lay-out. FIG. 9B is the legend for FIGS. 9A, 9C and 9D. In FIG. 9A, a plan view of the construction materials to be installed is shown, in this case the construction material is concrete formwork, which is graphically modeled on the screen from a previously developed electronic model representation of its desired position on the work site. A desired position point and the current position point are shown on the display both graphically within the electronic model representation and with numerical coordinates. FIG. 9C illustrates an ability to graphically zoom into the view for accurate graphical positioning. At the same time, the operator can refer to the coordinates of the current position of the portable position sensor 40 which are continuously updated as the portable position sensor 40 is moved toward the desired location. In addition, the difference of the current position of the portable position sensor and the desired position is also displayed and continuously updated. FIG. 9D illustrates the screen of the display 54 when the portable position sensor has reached the desired location.

Another application of the present invention is for the positioning of mechanized equipment for earthmoving. FIGS. 10A and 10B show the screen of a display 54 showing graphically the current position of the active edge of a piece of equipment located within a graphical database model of the appropriate cross-section of the site. FIG. 10B is the legend for FIG. 10A. The graphical database model of the cross-section shows both original subgrade and the final design grade which is to be achieved. FIG. 11A and 11B show the active edge of a paving machine when is has reached the finished design grade. The real-time information provided by the screen of the display 54 shown in FIGS. 10A and 11A eliminates the need for center line or slope staking. At anytime the operator can determine the amount of fill or cut required at the center line of the blade of the equipment. The design pitch and the actual pitch of the equipment are also provided. FIG. 12A illustrates a screen where hidden obstacles can be graphically displayed via an electronic model representation of the previous installation of the obstacles. FIG. 12B is the legend for FIG. 12A.

The amount of graphical information which can be simultaneously displayed to the user of the spatial positioning system will be limited only by the ability to graphically present the graphical database information modeling the environment of the portable position sensor 40.

Figure 13:
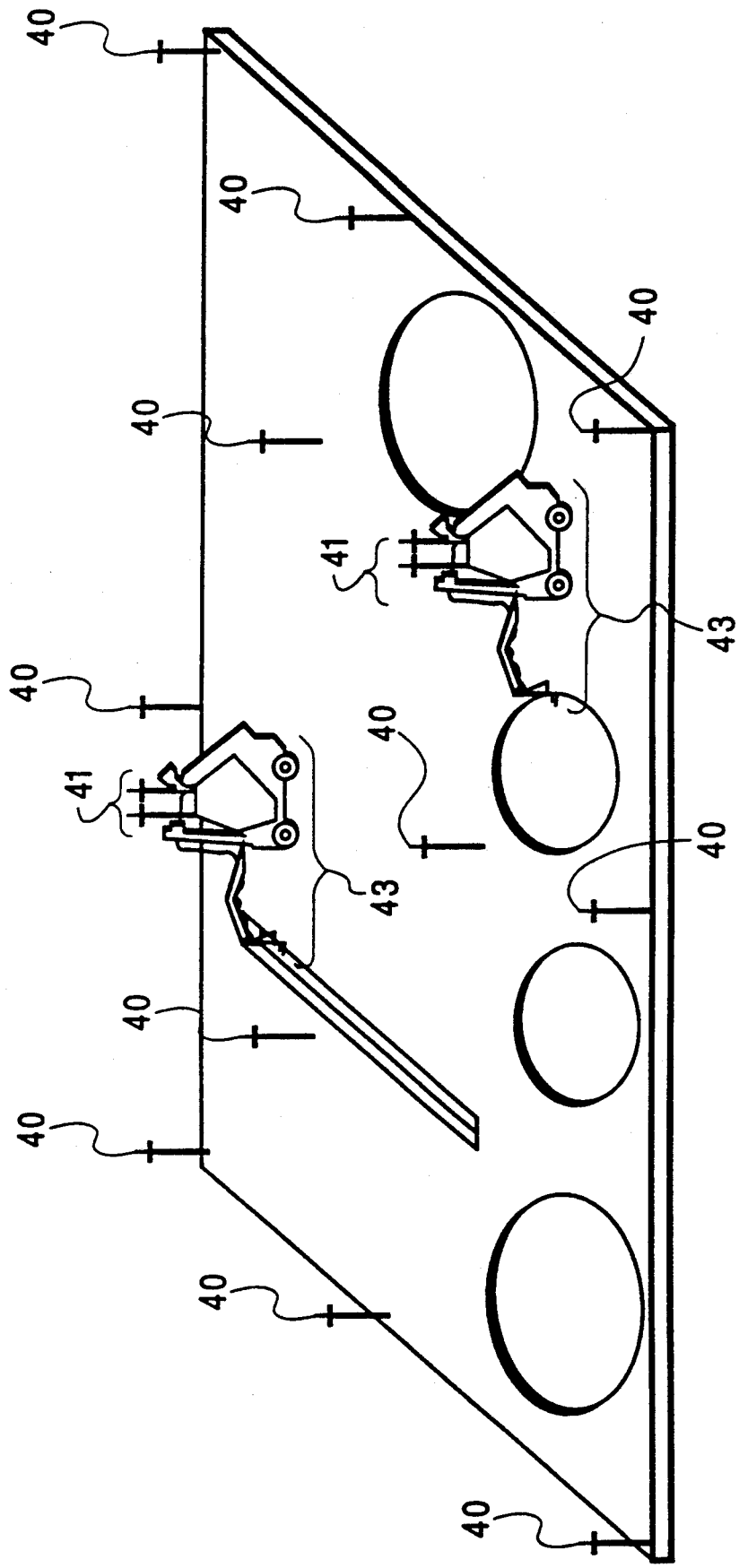
FIG. 13 illustrates an automated environment with equipment for yaw control in accordance with the present invention.

The disclosed positioning system may also be used for monitoring fabrication of components. FIG. 13 shows the manufacturing of a steel plate. A number of position sensors 40 are located throughout the surface of the steel plate. The orientation of the steel plate is positioned in space from fixed stations (not shown). As cutting operations are performed by the cutting robot 43, any movement in the steel plate is measured and analyzed. These movements are then transferred to a base coordinate system, so that the accuracy of the cutting robots is maintained.

Figure 14:
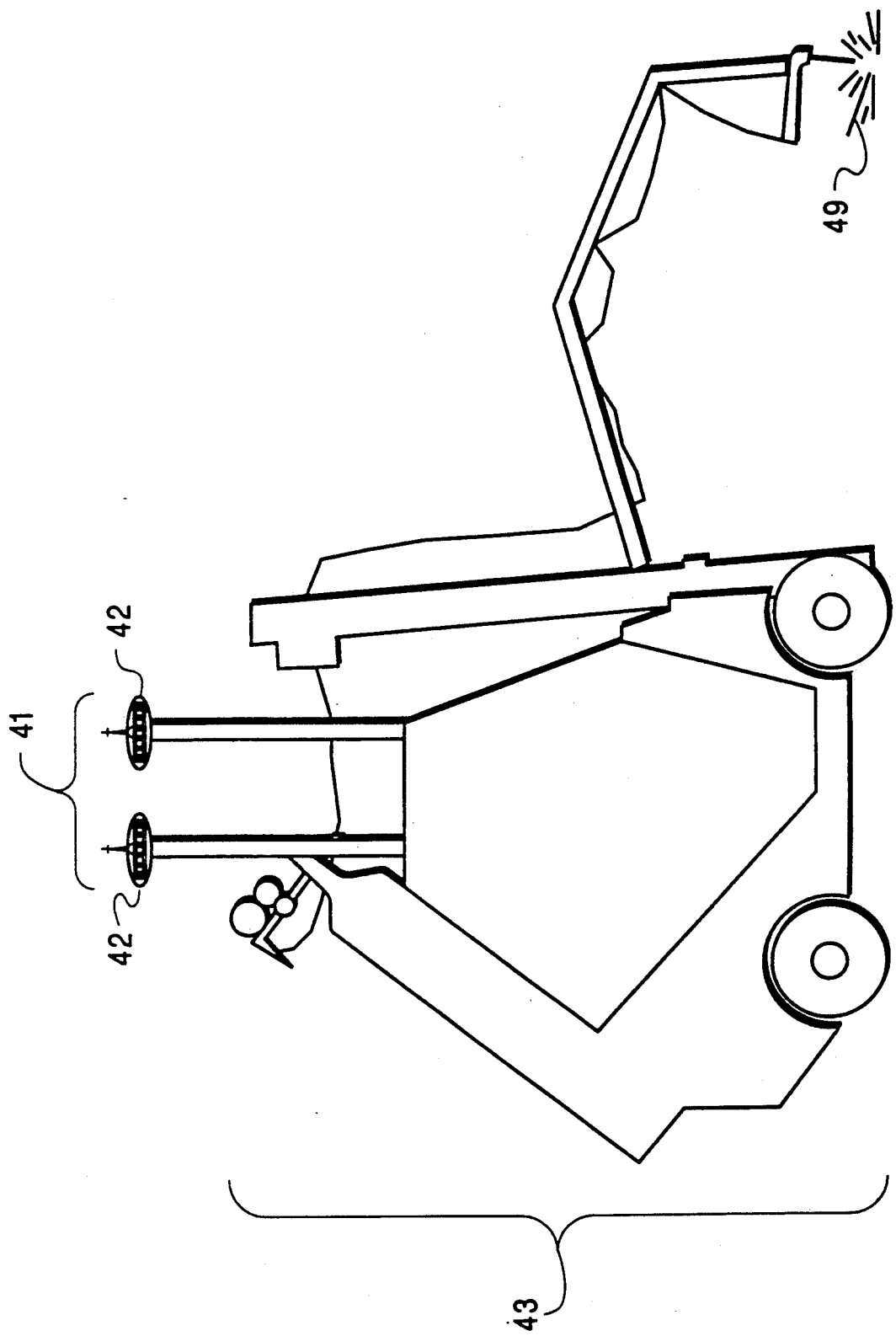
FIG. 14 illustrates a mechanized cutting robot with yaw control in accordance with the present invention.

The cutting robot 43 is further shown is FIG. 14 The cutting robot is guided by the use of a pair of polygonal detectors 42. This pair of detectors form a yaw measurement mechanism 41. Through the use of the yaw measurement mechanism, the changes in the direction of the robot 43 in the x-y plane can be monitored. The position of the active edge of the equipment 49 (in this case a cutting tool) is determined from measuring the angles and orientation of each movable link in the arm of the cutting robot. The methods of measurement of the movable links is known to those knowledgeable in the art and can be accomplished using one of many methods, including but not limited to, using rotational encoders at each rotational joint. These encoders transmit a degree of rotation to a computer from which the geometric position of the tool can be calculated. The computer would also interpret the yaw information from the yaw measurement mechanism 41. The data from the joint rotation mechanism and the yaw mechanism would be used to control the movement of the cutting robot, via control mechanisms, known to those knowledgeable in the art. The computing of the yaw measurement mechanism 41, the joint rotation mechanism, and the control of the cutting robots can be accomplished through the use of separately linked computers (not shown) or with a single computer.

FIG. 15 shows a pitch, roll, and yaw measurement mechanism 45 for a bulldozer. The same pitch, roll and yaw measurement mechanism 45 would work for any piece of equipment, autonomous vehicle, or robot that required pitch, roll and yaw control in addition to providing position. The pitch, roll, and yaw measurement mechanism 45 includes three polygonal detectors 42. The three polygonal detectors are positioned on a fixed component of the bulldozer. The relative positions of the three detectors should be in a pattern such that the three detectors form a triangle. A triangular arrangement is preferred, with any orientation acceptable, except an arrangement were the three detector approach a straight line. The pitch, roll, and yaw measurement mechanism 45 would have a computer (not shown). Measurement of the active edge of the equipment 49 (in this case the bulldozer blade) could be accomplish in a fashion similar to the cutting robot described above, or through measuring the lengths of the hydraulic actuators and arms which control the active edge of the equipment, in a manner known to those knowledgeable in the art.

If the bulldozer is to run autonomously, the guidance of the bulldozer can be effected in a fashion similar to the cutting robot described above. If the bulldozer is to be controlled by an operator, display screens such as those shown in FIG. 10A would be provided for the operator to view and thus receive position information. Similar displays could be used for various other applications and for different equipment.

The active edge of the equipment may also be positioned by disposing one or more polygonal detectors on parts that are directly related to the active edge of the equipment. For the cutting robot 43 a single polygonal detector could be placed at a known distance directly above the cutting tool, and consequently, could properly locate the cutting activity. Similarly for the bulldozer 48, two polygonal detectors located at either end of the top of the bulldozer blade can identify the location of the active edge of the equipment. This same configuration could be used for many other pieces of equipment and applications.

Although the equipment controls mentioned above are for aboveground applications in a manufacturing environment and/or in an outdoor environment, the current invention can also be utilized for other applications. The first such application is for parts machining. In parts machining, cutting tool locations can be fixed and the machined part can be moved. A system of polygonal detectors would be placed on the part to be machined. Coordinated indexing of the coordinate system of the machined part to the location of the active machining part would be continuously updated. A second application would be use of a waterproof version of the present invention for underwater location. The primary limitation of underwater use is in the distance which could be covered by the system. Turbidity of the water would significantly affect the overall distance covered by the system. A third application would be in space construction and space docking maneuvers.

The above description of the invention is for illustrative purpose only. Modification can be made, within the scope of the invention as defined by the appended claims.

We claim:

1. A spatial positioning system for determining the instantaneous x-y-z position of a movable object in a three-dimensional Cartesian coordinate system, comprising:

at least three fixed referent stations, each said station emitting a divergent rotating laser beam and also emitting a communication pulse when its laser beam crosses a predetermined rotation datum;

a sensor mounted on the object, said sensor including:

detector means for detecting said laser beams, said detector means emitting a signal indicating detection of a laser beam;

communication pulse receiving means for receiving said communication pulse, said communication pulse receiving means emitting a signal indicating receipt of a communication pulse; and a determination means for determining the instantaneous x-y-z position of the object based on the signals emitted from said detector means and the signals emitted from said communication pulse receiving means.

2. A spatial positioning system for determining the instantaneous x-y-z position of a movable object in a three-dimensional Cartesian coordinate system, comprising:

at least three fixed referent stations, each said station emitting a rotating laser beam and also emitting a communication pulse when its laser beam crosses a predetermined rotation datum;

a sensor mounted on the object, said sensor including:

detector means for detecting said laser beams, said detector means emitting a signal indicating detection of a laser beam;

communication pulse receiving means for receiving said communication pulse, said communication pulse receiving means emitting a signal indicating receipt of a communication pulse; and a determination means for determining the position of the object based on the signals emitted from said detector means and the signals emitted from said communication pulse receiving means, wherein said at least three fixed referent stations include at least two horizontal fixed referent stations and at least one vertical fixed referent station, each of said horizontal stations emitting a laser beam which is divergent in a vertical plane and is rotated in a horizontal plane, and said at least one vertical station emitting a laser beam which is divergent in a horizontal plane and is rotated in a vertical plane.

3. A system according to claim 2, wherein three horizontal fixed referent stations are used.

4. A system according to claim 3, wherein one fixed vertical referent station is used.

5. A system according to claim 2, wherein said detector means includes a disk-shaped detector having a photosensitive surface about its periphery.

6. A system according to claim 1, wherein said detector means includes a polygonal support having a plurality of facets, each facet having a photosensitive element disposed thereon.

7. A system according to claim 4, wherein said determination means assigns a time label corresponding to the time that each laser beam and each communication pulse is received, and said determination means then determines the position of the object and the x-y directions by: (1) calculating a corresponding horizontal angle for each horizontal fixed station, said angle being formed between a line connecting the corresponding horizontal fixed station and another horizontal fixed station and a line connecting the corresponding fixed station and said sensor, by taking the ratio of the time of detection of a laser beam by the detector means minus the time of receipt of a first communication pulse plus an off-set to the time of receipt of a second communication pulse minus the time of the first communication pulse, multiplied by 360 degrees, and (2) solving the following equations:

$$x = \frac{L * \tan\phi_b}{\tan\phi_b - \tan\phi_a}, \quad y = \frac{L * \tan\phi_a * \tan\phi_b}{\tan\phi_b - \tan\phi_a}$$

8. A system according to claim 7, wherein said determination means determines the position of the object in the z-direction by: (1) calculating a corresponding vertical angle for said vertical fixed station, said angle being formed between a vertical plane and a line connecting the vertical fixed station and said sensor, by taking the ratio of the time of detection of a laser beam by the detector means minus the time of receipt of a first communication pulse to the time of receipt of a second communication pulse minus the time of the first communication pulse, multiplied by 360 degrees, and (2) solving the following equation:

$$z = r * \sin(\phi_c - 90°)$$

9. A system according to claim 1, wherein said determination means is coupled to a display means for displaying the position of the object.

10. A system according to claim 9, wherein said determination means is coupled to an input means for inputting information from an operator to the determination means.

11. A system according to claim 10, wherein said display means and said input means are provided by a touch screen.

12. A system according to claim 1, wherein three fixed referent stations are used, each of said fixed stations emitting a laser beam which is rotated about a vertical axis and is divergent in a plane which is tilted by a predetermined degree from the vertical axis.

13. A system according to claim 1, wherein three fixed referent stations are used, each of said fixed stations emitting a divergent laser beam which is rotated about an axis having an attitude distinct from an axis of rotation of each other fixed station.

14. A system according to claim 1, wherein the object is mounted on machinery at a construction site.

15. A system according to claim 13, wherein said machinery is a bulldozer.

16. A system according to claim 13, wherein said machinery is an earthmoving vehicle.

17. A spatial positioning system for determining the instantaneous x-y-z position of a movable object in a three-dimensional Cartesian coordinate system, comprising:

at least three fixed referent stations, each said station emitting a rotating laser beam and also emitting a communication pulse when its laser beam crosses a predetermined rotation datum;

a sensor mounted on the object, said sensor including:
  detector means for detecting said laser beams, said detector means emitting a signal indicating detection of a laser beam;
  communication pulse receiving means for receiving said communication pulse, said communication pulse receiving means emitting a signal indicating receipt of a communication pulse; and
  a determination means for determining the position of the object based on the signals emitted from said detector means and the signals emitted from said communication pulse receiving means, wherein the object is mounted on an autonomous vehicle, and design information from a graphical database is input into said determination means to provide guidance based on position matching.

18. A system according to claim 17, wherein design information from a graphical database is input into said determination means to provide guidance based on position and orientation matching.

19. A system according to claim 17, wherein design information from a graphical database is input into said determination means so that the actual position of said object can be compared to a desired position of said object.

20. A system according to claim 17, wherein said system provides, pitch-, roll and yaw information of the vehicle.

21. A system according to claim 17, wherein said system provides yaw information of the vehicle.

22. A system according to claim 1, wherein a secondary position sensing unit is provided, said secondary position sensing unit including a vision mechanism.

23. A system according to claim 1, wherein said communication means includes a radio transmitter.

24. A system according to claim 1, wherein said communication means includes a omnidirectional optical strobe.

25. A system according to claim 1, wherein said communication means includes a rotating unidirectional optical strobe.

26. A system according to claim 1, wherein the object and said fixed referent stations are underwater.

27. A system according to claim 1, wherein said determination means further includes laser beam identification means for identifying the particular fixed referent station from which a laser beam was emitted.

* * * * *